Patented Apr. 17, 1928.

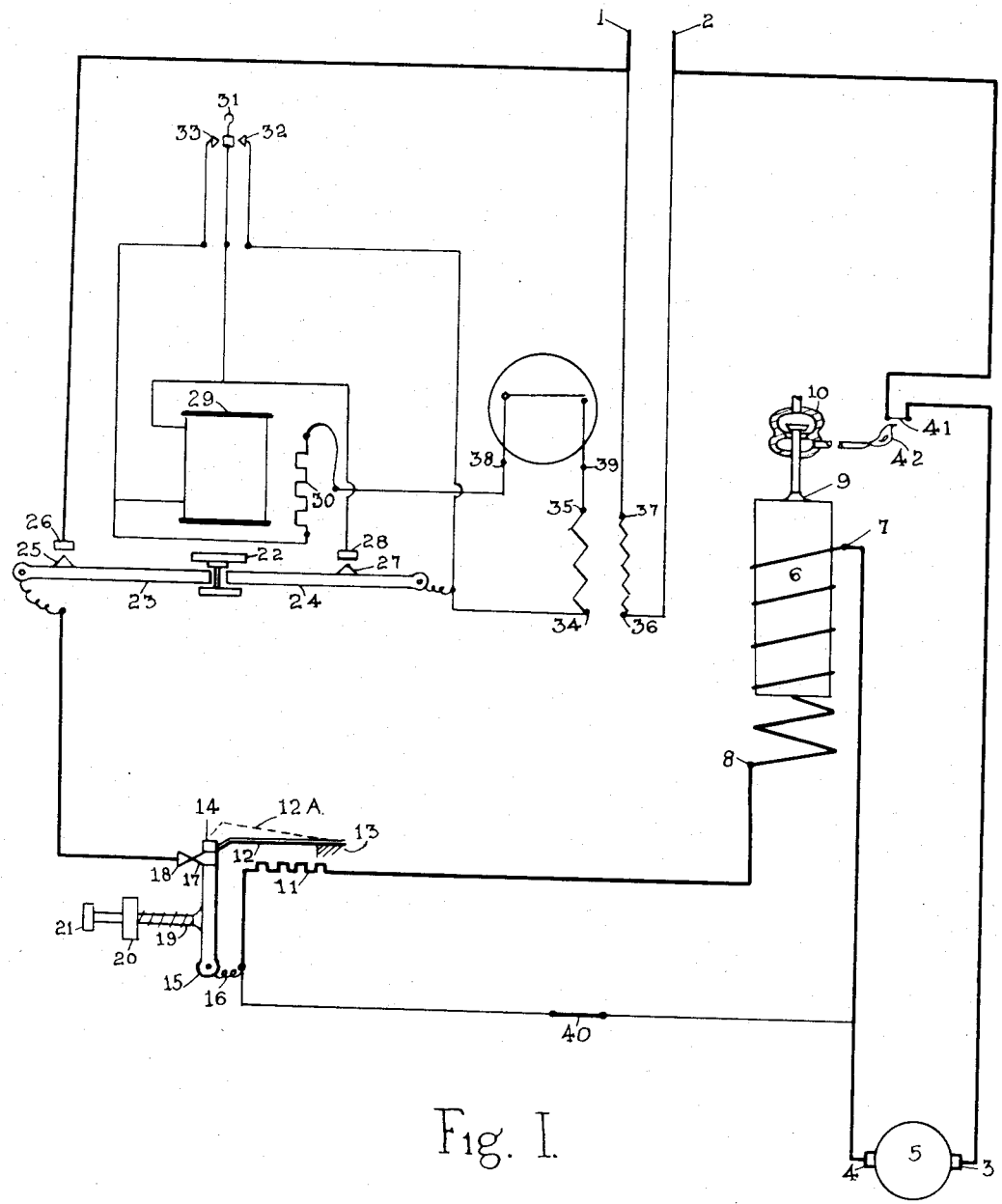
Fig. I.

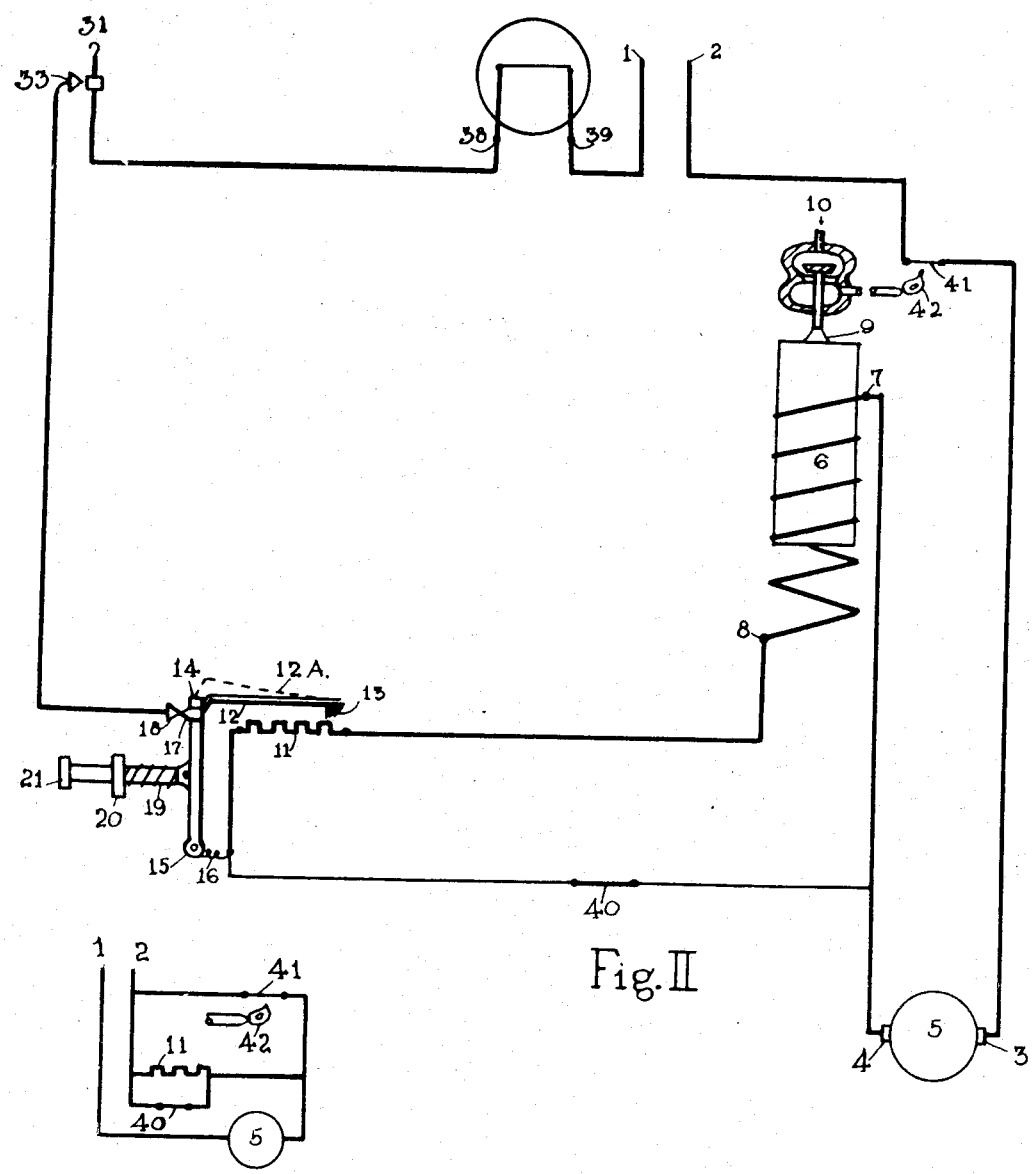

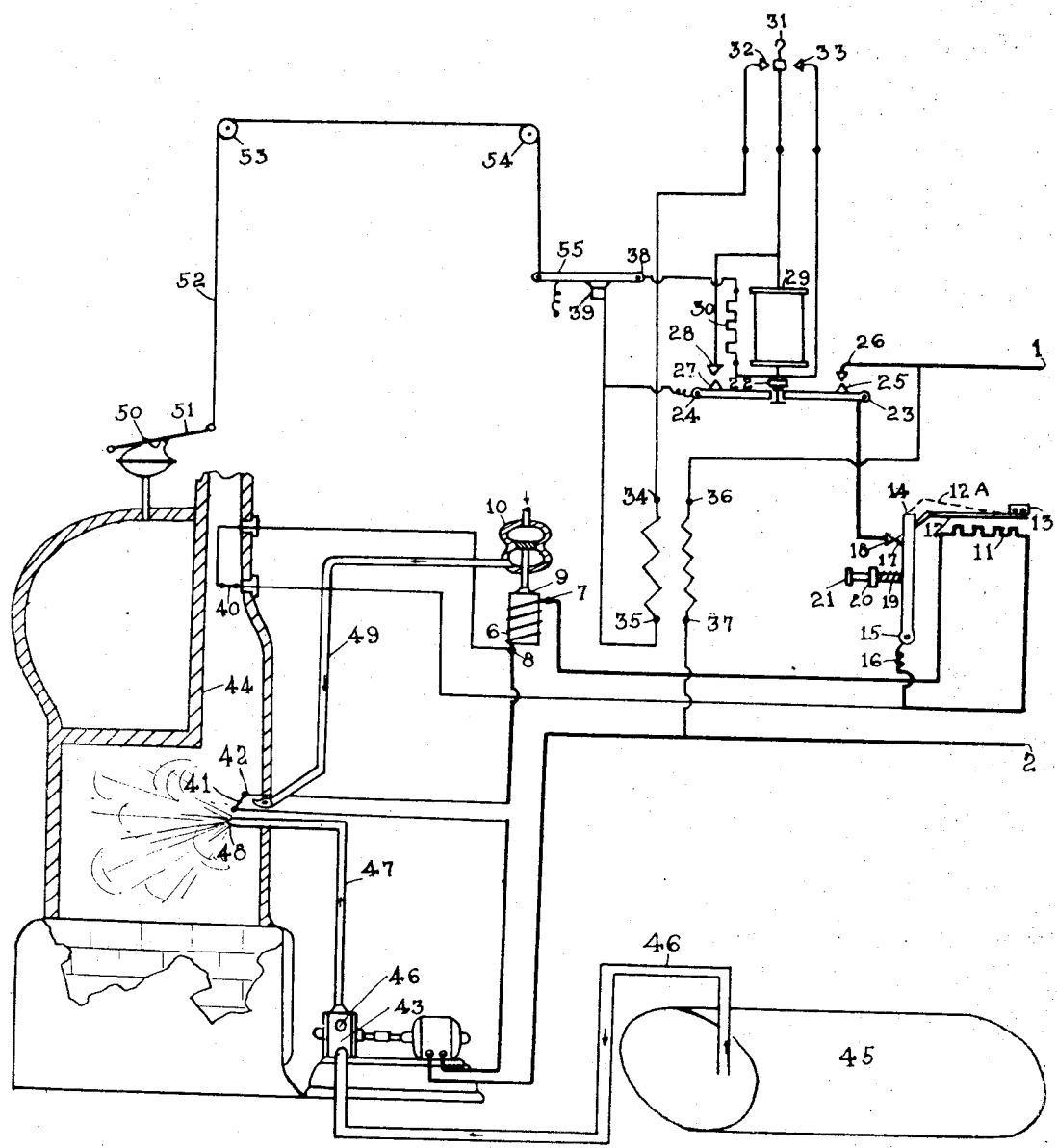
Fig. III

1,666,331

UNITED STATES PATENT OFFICE.

FRANK FISCHER, OF LARCHMONT, NEW YORK, AND ARNOLD FRANCIS VAN PELT, OF INTERLAKEN, NEW JERSEY, ASSIGNORS TO GRANT OIL BURNER CORPORATION, OF WILMINGTON, DELAWARE, A CORPORATION OF DELAWARE.

ELECTRICAL SAFETY CONTROL CIRCUIT FOR AUTOMATIC BURNER EQUIPMENT.

Application filed August 27, 1925. Serial No. 52,946.

This invention relates to automatic safety control circuits for burners in which the oil or other fuel is automatically ignited, fed, and stopped, intermittently in accordance with the rise and fall in temperature of a control-station heated by the burner. Our apparatus has to do with the class of burner circuits described in our Patent No. 1,546,640; and pertains particularly to an improvement whereby mechanical moving parts subjected to heat are eliminated, and the device is operated more completely by electrical means thereby greatly simplifying, and increasing the reliability and life of the control mechanism.

It is a well known property of certain materials which enables them to offer little resistance to the flow of electricity when heated, and a relatively high resistance when cool—in marked contrast, for instance, to the electrical conductivity of nickel which decreases as its temperature rises. The flow of current through such material, when once heated, tends to maintain the temperature and consequent conductivity of the material, as in the well known Nernst lamp; but the relation of current to cross-sectional area may be such as to avoid this electrical maintenance of conductivity if desired.

By inserting in a specially arranged electric circuit, particles of such material (certain infusorial-earths, for example) in locations subjected to the heat produced by the burner, pilot light, etc., we obtain a novel electrical control circuit which is unusually simple in construction and safe in operation. The above described material will hereinafter be referred to by the descriptive name "heat-requiring conductor" which designates the nature and function of this factor in our invention.

The general object of this invention is to provide a simple and safe automatical control for burners.

A specific object is to eliminate all moving parts which are subject to high temperature.

Another object is to provide in the circuit a material which is substantially a poor conductor of electricity at room temperatures and a relatively good conductor at high temperatures, in the place of temperature-actuated mechanical contactors.

Another object is to provide one of these special heat-requiring conductors in proximity to the pilot-light so as to prevent operating the burner if the pilot light should go out.

Another object is to provide a heat-requiring conductor in proximity to the pilot-light so as to re-ignite the pilot in case it should go out while current is passing through the conductor.

Another object is to automatically start the fuel-supply motor and the ignition system of the burner when the circuit is closed by any means such as a manually operated switch, or a thermostat, boiler control, or similar device.

Another object is to automatically stop the fuel-supply motor and the ignition system of the burner when the circuit is opened by any means such as a manually operated switch, or a thermostat, boiler control or similar device.

Another object is to shut off the ignition system after the burner is lighted.

Another object is to start the ignition system again automatically if the burner should go out for any reason whatsoever, other than the complete shutdown of the burner.

Another object is to shut down the fuel-supply motor and the ignition system automatically in a predetermined time if the oil or other fuel has failed to ignite.

Another object is to shut down the fuel-supply motor and ignition system automatically in a predetermined time upon the failure of any one of the elements in the control circuit.

Another object is to shut down the burner and ignition system automatically if the fuel supply should fail.

Another object is to prevent the burner from automatically starting after it has shut itself down because of failure to obtain ignition, or failure of any of the elements in the circuit, or failure of the fuel supply as aforesaid,—said shut-down to be maintained until the equipment is inspected and the control manually reset.

Other objects will hereinafter appear.

The nature and scope of this invention are more fully explained in the following description taken in connection with the accompanying drawings forming part of the specifications, in which:—

Fig. I is a diagram of our circuit adapted for alternating current and provided with a main power circuit and a secondary control circuit.

Fig. II is a diagram of our circuit for either direct or alternating current in which the full line current is carried by the thermostat, boiler-control, etc.

Fig. III shows an oil-burning furnace equipped with our control circuit of the type outlined in Fig. I.

Fig. IV is a modification of our circuit in which the heat-requiring conductor used in connection with the ignition means is placed in a parallel instead of a series circuit.

Similar numbers refer to similar parts throughout the several figures.

In Fig. I, 1 and 2 are alternating current power leads of any voltage or frequency—2 being preferably the grounded side of the line, if the line is grounded.

3 and 4 are terminals of electric motor 5 which drives the pump or other apparatus supplying fuel to the burner. 6 is a solenoid with terminals 7 and 8, and movable core 9; although a rotary form of motor could readily be substituted here for performing the mechanical work of operating a valve, switch, or other ignition apparatus. 6 will therefore be referred to hereafter as the ignition-motor.

10 is a gas valve operated by ignition-motor 6.

11 to 21 inclusive comprise a time-limit cut-out in which 11 is a resistance wire or heating coil; 12 is a piece of thermostatic metal with one end fastened rigidly at 13 and the other end bearing against brass member 14 which is pivoted at 15.

Thermostatic metal 12 is superimposed above the resistance wire or heating-coil 11 and bends upward when heated, as indicated by dotted lines 12ª. Member 14 is connected through flexible lead 16 to coil 11, and carries contactor 17 which is held against contactor 18 by the end of thermostatic metal 12. 19 is a compression spring bearing against brass member 14 at one end and against fixed piece 20 at the other. Compression spring 19 provides a quick break between contactors 17 and 18 when thermostatic metal 12 has been heated by coil 11, and has moved above the end of member 14 as indicated by broken lines 12ª.

21 is a re-setting member which passes through a hole in fixed piece 20, through compression spring 19, and fastens to member 14. Its purpose is to enable member 14 with its contactor 17, to be pulled over against contactor 18 so as to allow thermostatic metal 12 to spring downward and reset against member 14 when thermostatic metal 12 has cooled sufficiently.

22 to 37 inclusive are parts of a commercial relay, a thermostat, and a transformer, all interconnected for the purpose of automatically closing and opening the power circuit, at predetermined temperatures or pressures. 22 is the relay armature, carrying an insulated hook for lifting relay arm 23 and 24.

25 and 26 are contactors on the relay in the main power circuit. 27 and 28 are low voltage contactors. 29 is an electro-magnet. 30 is a resistance coil. 31, 32 and 33 are contactor points on a low voltage thermostat. 34 and 35 are the terminals of the secondary winding of a transformer; 36 and 37 are terminals of primary winding of the said transformer. 38 and 39 are terminals of a switch or similar device usually connected mechanically or electrically in some suitable manner to the boiler or furnace or other apparatus which contains the burner, as in Fig. III.

40 is a selected piece of infusorial-earth or heat-requiring conductor above described, connected in a shunt circuit around ignition-motor 6 and heating coil 11. 40 may be located in the fire-box of the furnace, or in any location in which it will be responsive quickly to temperature changes of the burner.

41 is a second heat-requiring conductor connected in series in the main line leading to fuel-supply motor 5; and located in proximity to the gas pilot flame 42 which maintains it at a suitable conductive temperature when the pilot is lighted.

Hereafter, 6 and 9 will be referred to as an ignition-motor; 11 to 21 will be referred to as a time-limit cut-out; 22 to 29 will be referred to as a relay; 31 to 33 will be referred to as a thermostat; 34 to 37 will be referred to as a boiler-control; and 40 to 41 will be referred to as heat-requiring conductors. Where both heat-requiring conductors are referred to in the same claim, 41 will be designated as a pilot heat-requiring conductor.

The descriptive name "time-limit cut-out" explains the function of this cut-out apparatus; which function is to open an electric circuit passing through it, and thereby cut out any other apparatus connected in series with it, after the lapse of a certain predetermined time constituting the "time-limit" factor. The operation of the time-limit cut-out is hereinafter more fully described.

Fig. II contains no additional parts over

Fig. I, but on the other hand shows our control circuit without the relay and low-voltage circuit previously described.

Fig. III shows a convenient arrangement of the devices enumerated in which:

The solenoid ignition-motor, gas valve, time-limit cut-out, relay, transformer, and boiler-control switch, may be considered as located on a suitable panel-board all enclosed in a metal case or panel box. These parts are enlarged in the drawing to enable the circuit to be traced more readily.

The fuel-supply motor 5 and pump 43 are placed conveniently with relation to the boiler or furnace 44.

The thermostat is placed in the particular room or place, the temperature of which is to be controlled.

Oil supply tank 45 is connected by means of pipe 46 with the pump 43 which entrains oil from tank 45 and air through port 46; and after mixing them in the proper proportions, discharges them through burner supply pipe 47 and nozzle 48 into the firebox of the furnace.

Gas pilot flame 42 is fed through gas pipe 49 and gas valve 10, the latter being controlled by solenoid ignition-motor 6. Gas valve 10 permits, when closed, enough leakage of gas to supply the minimum size pilot flame 42.

In Fig. III the boiler-control is shown as a diaphragm piston 50 connected, through weighted lever 51 and chain or cable 52 passing over pulleys 53 and 54, with switch 55; although the whole boiler-control apparatus may be installed as a unit on the top of the boiler if preferred.

A practical modification of our circuit is shown in Fig. IV in which heat-requiring conductor 41 is connected in a shunt circuit around the heat-coil 11 of the time-limit cut-out, instead of in series with the fuel-supply motor.

The operation of our oil-burner control mechanism is as follows:

The power current is always presumed to be on lines 1 and 2; and pilot flame 42 is playing on heat-requiring conductor 41 so that 41 becomes an element in the main series circuit.

Assuming that the temperature or pressure of the boiler or furnace is below a predetermined point, above which it is to be maintained, the low temperature contacts 31 and 32 of the thermostat, and boiler-control leads 38 and 39 will be closed. The transformer, usually of the type to transform the normal 110 volt lighting current to a lower voltage (usually 24 volts), is energized, and is therefore in a position to supply current to the relay. At the predetermined temperature, the thermostatic member 31 of the thermostat makes contact with 32 which energizes the magnet 29 which in turn pulls up the armature 22 and the adjacent contactor arms 23 and 24 which in turn close contactors 25 to 26 and 27 to 28. The closing of contactors 27 and 28 magnetically lock the armature 22 in place and the closing of the main line contactors 25 and 26 complete the circuit for the current to travel from the supply line 2, through heat-requiring conductor 41 and fuel-supply motor 5, through the solenoid 6, through the time-limit cut-out, through the main contactors 25 and 26 of the relay, and back to line 1. (Heat-requiring conductor 40 being cool, obstructs the flow of current through it.)

This forms a series circuit in which the breaking of any of the lines or connections in the circuit would cause the entire circuit to become open and therefore inoperative.

The instant the relay picks up, the motor 5 starts, which in turn starts the pump and sprays oil into the furnace; the solenoid 6 is energized, which forces plunger 9 upward thereby opening the gas valve 10; and the heating coil 11 of the time-limit cut-out begins to heat up. If nothing further takes place, the heat generated in the coil 11 of the time-limit cut-out will cause thermostatic metal 12 to bend upward and pass the end of member 14. This in turn will allow compression-spring 19 to force member 14 out of its position and break contactors 17 and 18 which open the circuit and thereby de-energize the solenoid 6 and the motor 5. The plunger 9 falls to its normal position thereby substantially closing the gas valve 10 and the fuel-supply motor 5 stops, thereby stopping the flow of oil into the boiler or furnace.

However, when the motor 5 starts, the solenoid 6 opens the gas valve 10, and expands the pilot light 42, which is being fed by this gas valve; so that the fuel oil which is being sprayed into the furnace is thereby ignited.

After ignition has taken place, the heat-requiring conductor 40 which is located in the furnace 44 gets hot and changes its character from that of an insulator to a good conductor of electricity, substantially speaking, thereby shunting out solenoid 6 and heating-coil 11 in the time-limit cut-out.

Shunting out the solenoid in this manner allows the gas valve 10 to close, thereby contracting the pilot to its normal position. Shunting out the heating coil 11 permits it to cool down and therefore thermostatic member 12 does not move and contactors 17 and 18 cannot be forced apart by compression-spring 19; and the burner continues to function normally.

Heat-requiring conductor 40 therefore acts as a monitor over the time-limit cut-out, preventing it from functioning or permitting it to function according to whether the burner is ignited or not ignited respectfully; and its introduction in the circuit constitutes an important part of this invention.

If the gas pilot, which is expanded by the solenoid 6 pressing against the gas-valve 10 should for any reason fail to expand, or the electric or other ignition system which is started in operation by the solenoid 6 should fail to operate, it will be seen that oil will be sprayed into the furnace but not ignited. Under these circumstances the heat-requiring conductor 40 would receive no heat, and consequently would obstruct the flow of current through it, so that the current taken to operate the motor would continue to pass through the time-limit cut-out (particularly through the heating coil 11) and through the solenoid 6. The heat generated in the resistance wire of heating coil 11 under these circumstances would be sufficient, in a predetermined time, to cause thermostatic member 12 to move upward allowing compression-spring 19 to act and break the contact at 17 and 18 and thereby open the circuit and shut down all of the apparatus.

If the burner should be functioning normally and the oil supply should become exhausted, combustion would of course cease. This would allow heat-requiring conductor 40 to cool and resist the flow of current through its shunt circuit, so that all of the current taken by the motor would pass through the coil 11 of the time-limit cut-out and the apparatus would shut down as explained above.

After sufficient current is flowing through heat-requiring conductor 41, the heat produced by the current renders it incandescent and thereby maintains its electrical conductivity. If the gas pilot should go out, for any reason after the burner is ignited, the heat generated by the current passing through heat-requiring conductor 41 is sufficient to maintain the conductivity of the conductor, and to re-ignite the gas pilot. If, on the other hand, the pilot should go out before the relay closes, then the main circuit will remain open since the necessary current cannot flow through heat-requiring conductor 41 when the latter is relatively cool.

If the pilot should go out with the circuit arranged as shown in Fig. IV, most of the current would be shunted through heat-coil 11 of the time-limit cut-out so that the time-limit cut-out would open the circuit and shut down the fuel-supply motor in a short predetermined time as previously described.

Our circuit may be used without heat-requiring conductor 41, in which case the time-limit cut-out will shut down the burner in a short predetermined time, as previously described, if the pilot should go out and ignition should fail for this or any other reason.

It is to be understood that this invention is not limited to the exact form or arrangement of parts shown in the accompanying drawings, but that modification therein may be made without departing from the spirit of the invention.

We are aware that prior to our invention, relays, solenoids, and various forms of thermostatic controls have been used commercially for sundry purposes, and do not claim these individual circuits or parts in detail; but we do believe ourselves to be the first to make use of heat-requiring conductors in the manner and for the purposes herein set forth.

We claim:—

1. In an electrical control circuit for burners having gas ignition pilots, a fuel-supply motor, a heat-requiring conductor, the conductor being located adjacent to the pilot so as to be heated and thereby rendered conductive by the pilot when the pilot is ignited, the conductor being connected in series with the motor so that the motor cannot start when the pilot is not ignited, the conductor being so proportioned as to be heated by current passing through it and thereby maintained in a conductive state independently of the pilot when the motor and conductor are energized so that the motor will continue to run if the pilot goes out while the motor and conductor are energized.

2. In a control circuit for burners having gas ignition pilots, a fuel-supply motor, a heat-requiring conductor, the conductor being located adjacent to the pilot so as to be heated and thereby rendered conductive by the pilot when the pilot is ignited, the conductor being connected in series with the motor, so that the motor can start when the pilot is ignited, the conductor being so proportioned as to be maintained in a state of incandescence by the flow of current through it when the motor is energized so that the incandescent conductor will re-ignite the pilot if the pilot goes out while the motor is energized.

3. In an electrical control circuit for burners having ignition pilots, a fuel-supply motor, a heat-requiring conductor located adjacent to the pilot so as to be heated and thereby rendered conductive by the pilot when the pilot is ignited, the conductor being connected in series in the control circuit so as to open the circuit and prevent starting the motor when the pilot is not ignited, the conductor being so proportioned as to be heated by current passing through it and thereby maintained in a conductive state independently of the pilot when the conductor is energized, so that the circuit will remain closed and the motor will continue to run if the pilot goes out while the conductor is energized.

4. In a control device for burners, a fuel-supply motor, a motor control circuit, a gas ignition pilot, a heat-requiring conductor located adjacent to the pilot so as to be heated and thereby rendered conductive by the pilot when the pilot is ignited, the conductor being connected in series in the control circuit so as to open the circuit and prevent starting the motor when the pilot is not ignited, the conductor being so proportioned as to be maintained in a state of incandescence by the flow of current through it so as to re-ignite the pilot if the pilot goes out while the conductor is energized.

FRANK FISCHER.
ARNOLD FRANCIS VAN PELT.